(12) United States Patent
Manstein et al.

(10) Patent No.: US 7,634,440 B2
(45) Date of Patent: Dec. 15, 2009

(54) SECURE, OBJECTIVE ONLINE EXCHANGE, CONFIRMATION AND EVALUATION METHODS

(76) Inventors: Ralf Manstein, Sophienstr. 26, 76530 Baden-Baden (DE); Ursula Herzog-Denu, Ebersteinburger Str. 20, 76530 Baden-Baden (DE)

( * ) Notice: Subject to any disclaimer, the term of this patent is extended or adjusted under 35 U.S.C. 154(b) by 200 days.

(21) Appl. No.: 11/697,759

(22) Filed: Apr. 9, 2007

(65) Prior Publication Data
US 2008/0249915 A1 Oct. 9, 2008

(51) Int. Cl.
*G06Q 40/00* (2006.01)
(52) U.S. Cl. .......................................... 705/37; 705/38
(58) Field of Classification Search ............. 705/37–38
See application file for complete search history.

(56) References Cited

U.S. PATENT DOCUMENTS 6,341,353 B1 * 1/2002 Herman et al. ................. 726/5

* cited by examiner

*Primary Examiner*—Thu Thao Havan
(74) *Attorney, Agent, or Firm*—Jennifer Meredith; Meredith & Keyhani, PLLC

(57) ABSTRACT

The present invention provides a method for facilitating a trade between a buyer and a seller of a product, the seller offering a product for sale at a predetermined price; the buyer purchasing the product; determining buyer's sufficient currency status or insufficient currency status. If the buyers account has a sufficient currency status, holding monies in an amount equal to the predetermined price are transferred into a holding account; requiring the seller to verify the date of receipt of the monies; requesting the seller to verify the shipping status of the product within a shipping confirmation response time frame; requesting the buyer to verify the receipt status of the product within a receipt confirmation response time frame; and assigning a conduct value to the buyer and seller.

82 Claims, 4 Drawing Sheets

Continued to next page

Continued to next page

Continue to next page

SECURE, OBJECTIVE ONLINE EXCHANGE, CONFIRMATION AND EVALUATION METHODS

On an internet marketplace users offer goods and services (in the following called "product"). The first contact between buyer and seller is through their usernames which will identify them only as online members but not as a real people. The exchange of goods and payment for those goods are based mostly on trust. If the seller sends the goods first without getting paid he trusts the buyer to pay him. If the seller charges the selling price first to a credit card the buyer is at a disadvantage as he has to trust the goods will be delivered. Only the shipment by COD minimizes the risk for both,—the buyer may still just get an empty box.

There are many instances, especially in the online community, where either seller or buyer got taken and lost their goods or their money. In order to reduce the risk of fraud and to judge the reliability of the counterpart, in their role as buyer or seller, an exchange and evaluation system becomes necessary that follows every action taken by each trading partner and mirrors their online behavior. Until now correct conduct was not controllable as no security measures are built into the transactions that would help to avoid fraud. The evaluation of conduct was done by the opposite party. After a concluded sale, the buyer and the seller express their experience with the other party during the transaction or they may simply give him a grade. All other users are able to view these evaluations. In such a system subjectivity and misuse are a big danger. Misunderstandings or ill will can produce undeserved evaluations. On the other hand, someone can give himself a good rating by buying his own product under a different username and then tell tales about himself. Objective evaluation is completely impossible. The lack of built-in security measures allows for fraud which now is common place.

A system becomes necessary that can track every step of the sales transactions and makes them visible to both parties. This system should also measure the conduct of both parties, disallow subjectivity and allow only the objective and measurable conduct of the business partner to be rated. In addition to the standard technical security features such a system will objectify the less accessible element of the human conduct and decreases this special online security risk.

The present invention provides systems and methods that track the steps of a sales transaction and makes them visible to the business partners and measure the conduct of buyers and sellers to decrease the risk associated with purchasing items online or in non-traditional markets.

SUMMARY OF THE INVENTION

The present invention relates to secure, objective exchange, confirmation and evaluations methods and systems to decrease risk associated with purchasing items online.

According to one aspect of the present invention, a method for facilitating a trade between a buyer and a seller of a product is disclosed, the method comprising the steps of: offering a product for sale by a seller at a predetermined price; a predetermined price is the end sale price that may be arrived at by setting a firm price or by bidding for the product or another way that will establish a final sale price; committing to purchase the product by the buyer in an amount equal to a predetermined price; determining if the buyer's account has monies available in an amount greater than or equal to the predetermined price to provide a sufficient currency status or insufficient currency status, wherein the buyers account has a sufficient currency status, holding monies from the buyer's account in an amount equal to the predetermined price are transferred into a holding account to provide holding account monies; wherein the buyer's account has insufficient currency status, the transaction is concluded; messaging the seller the shipping address of the buyer; requiring the seller to verify the date of receipt of monies from the buyer's account in an amount equal to the predetermined price; requesting the seller to send off, hand over or exchange the product; requesting the seller to verify the shipping status of the product for sale or the exchange product within a shipping confirmation response time frame, wherein the shipping status may be shipped, not shipped, negligently shipped or no response; requesting the buyer to verify the receipt status of the product for sale within a receipt confirmation response time frame, wherein the receipt status may be selected from the group consisting of received/accepted, received/not accepted/final return, received/not accepted/exchange, not received and no response; requesting the seller to receive the returned product; requesting the seller to verify the return receipt status of the returned product within a receipt confirmation response time frame, wherein the return receipt status may be selected from the group consisting of received/accepted, received/accepted/exchange available, received/accepted/exchange not available, received/not accepted, not received and no response; requesting the buyer to send off or hand over said returned product; requesting the buyer to verify the return shipping status of the returned product within a shipping confirmation response time frame, wherein the return shipping status may be shipped, not shipped, negligently shipped or no response; assigning a conduct value to the seller based upon the shipping status and sellers confirmation thereof and the return receipt status and sellers confirmation thereof; assigning a conduct value to the buyer based upon the receipt status and buyers confirmation of receipt status and of the return shipping status and buyers confirmation thereof.

These and other features, aspects and advantages of the present invention will become better understood with reference to the following description and claims.

DETAILED DESCRIPTION OF THE INVENTION

Figure 1:
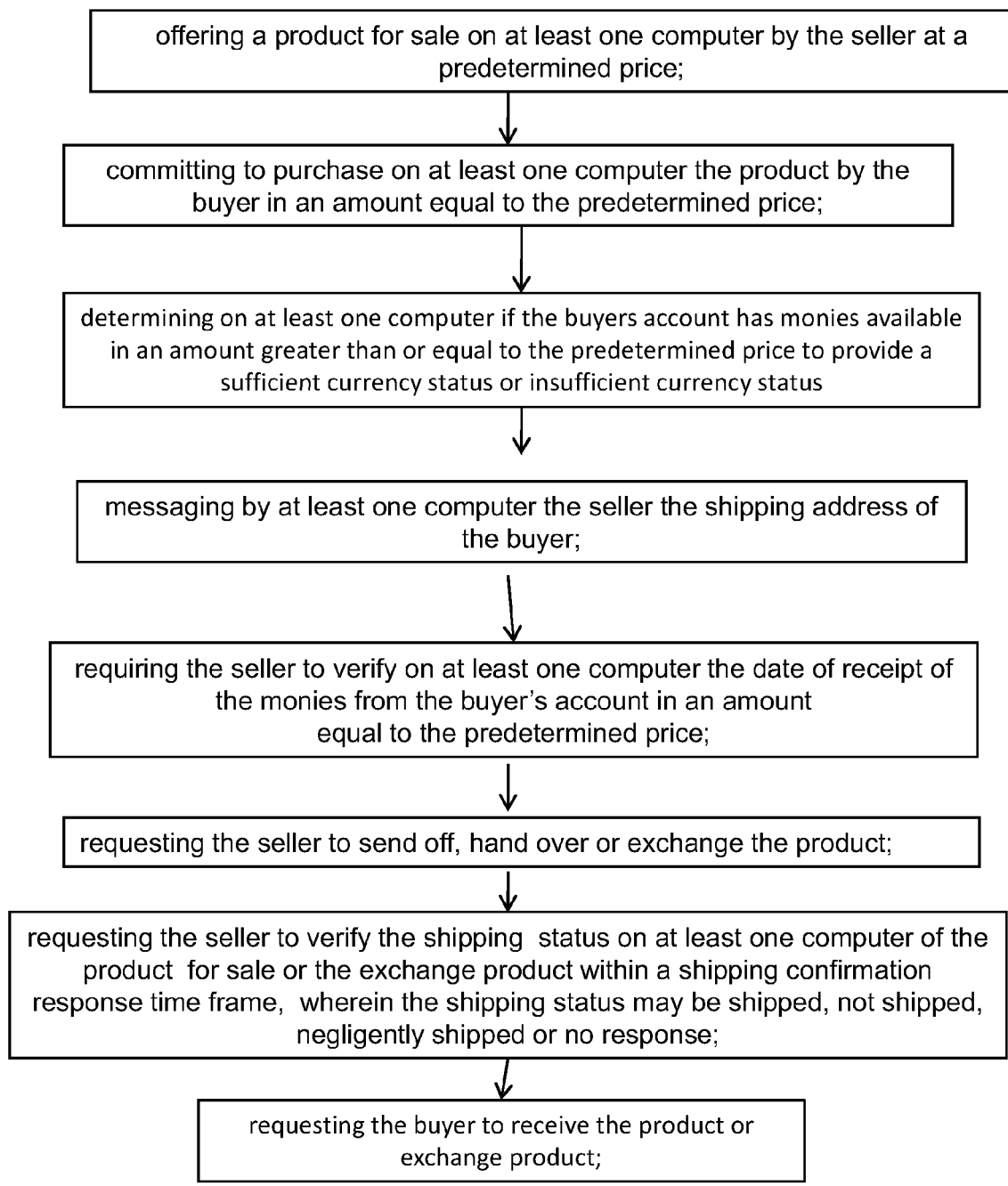
FIGS. 1-4 depict the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The secure objective exchange, confirmation and evaluation methods presented here are based on the root elements of a commercial exchange: product for money. For the seller this means handing over the product and receiving the monetary value in return. For the buyer this means receiving, accepting and paying for the product.

The user on the internet marketplace can act as buyer or seller. He has the responsibility to confirm every action necessary for the sales process which, according to the present invention, will now be transparent to the trading partners. How he deals with or confirms each action will be objectively registered and then his respective conduct is summarized and will result in his evaluation. The user automatically evaluates himself through his own behaviour. It should be understood that each step in the present invention may be computer implemented by a buyer and seller on their own computers.

He can follow his buy-sell transactions and the other parties actions and confirmations in his online account and through automatic email notification. Any user or visitor to the website can view this evaluation at any time by clicking on the user's name. Other than username and evaluation no personal info will be shown although the personal data is known to the operator of the platform.

Sellers and buyers are exchanging a product for currency. A product may be goods and/or services. Currency may be anything of value. The basic re-occuring actions are: (1) Seller hands over the product to the buyer; (2) Buyer hands over the currency; (3) Seller receives the currency; and (4) Buyer receives the product. Actions that modify this basic scenario are: (1) Seller hands over an undesirable product; (2) Seller does not hand over the product; (3) Seller receives no currency; (4) Seller does not receive the returned product; (5) Seller does not accept the returned product; (6) Buyer does not accept the product and returns it; (7) Buyer does not accept the product and returns an undesirable product; (8) Buyer does not accept the product and does not return it; (9) Buyer does not receive the product; and (10) Buyer does not hand over the currency.

The tools to control these actions are: confirmation of every action, immediate counteraction if the confirmation or action of a trading partner runs contrary to a smooth uncomplicated transaction process, placement of currency into a neutral account till both parties have given their final confirmation that signals a mutually agreeable end to the transaction, evaluation of the confirmations in order to transfer the currency to the seller or back to the buyer or to find another mutually agreeable solution, risk reduction through rating and publishing the conduct of the trading partners.

Figure 2:
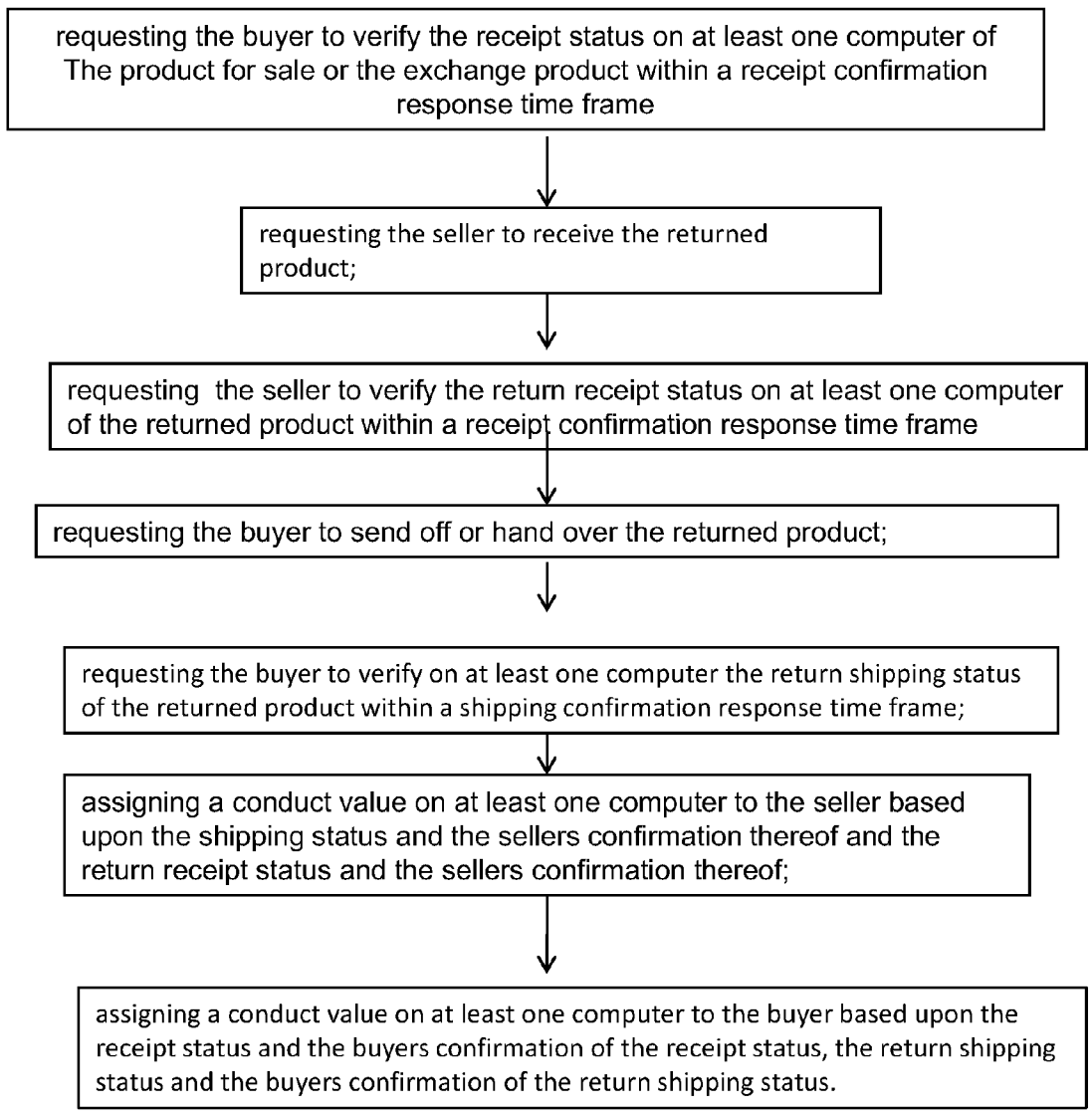
Figure 3:
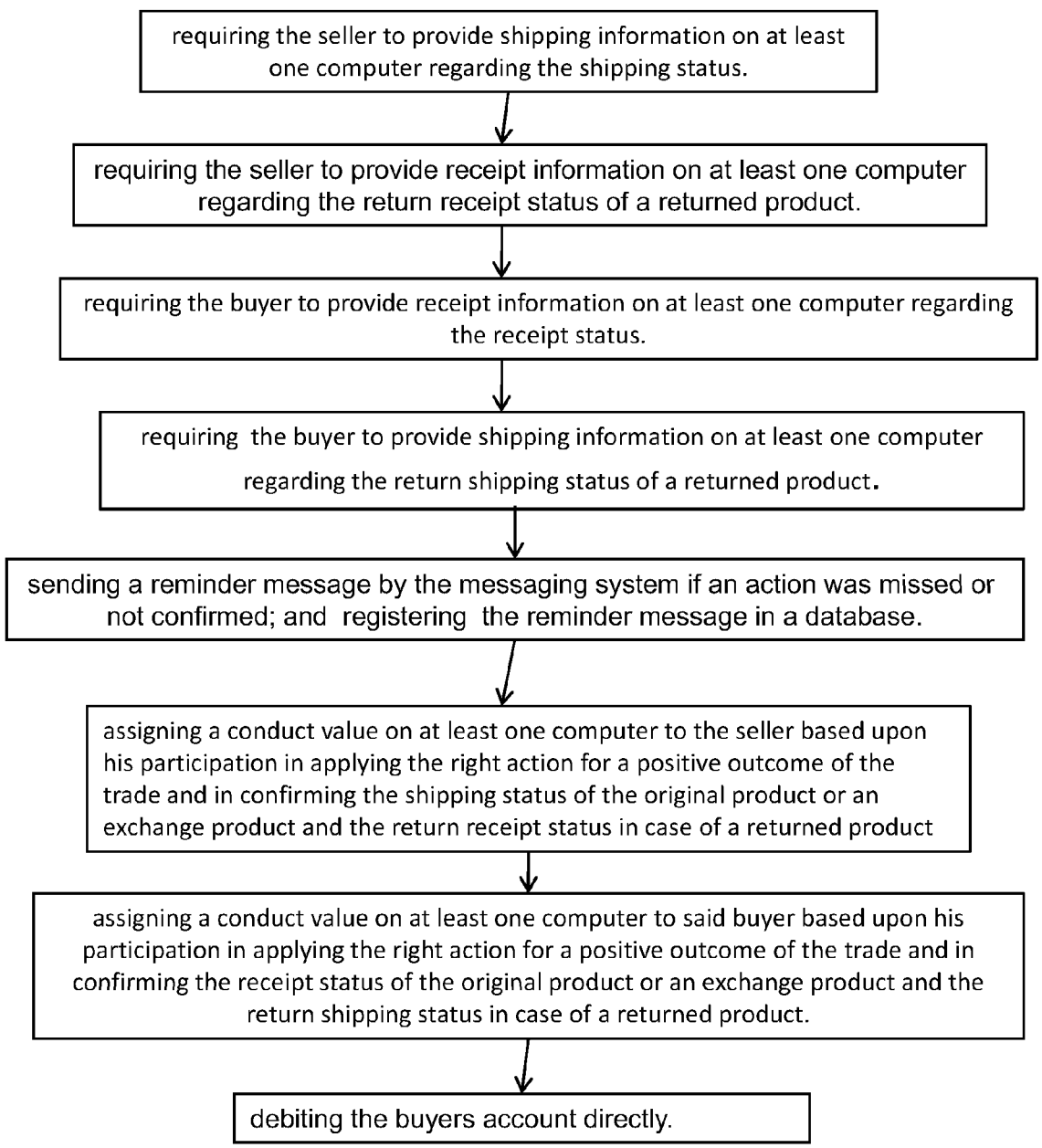
Figure 4:
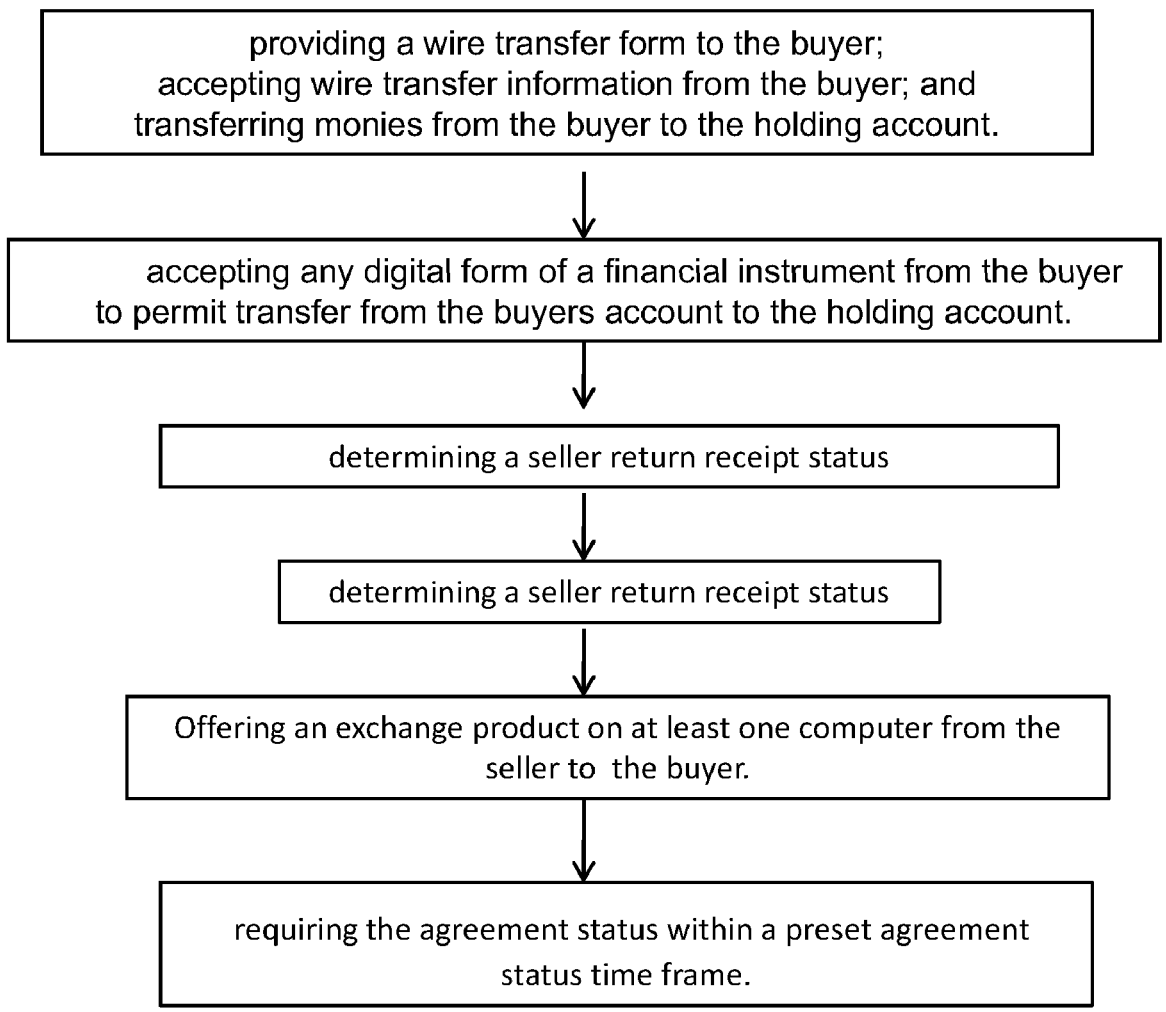

The present invention as described herein and depicted in FIGS. 1-4 provides a method for facilitating a trade between a buyer and a seller of a product. The buyer and the seller may be registered users of a market platform. A market platform may be an online, digital or other form of a community of buyers and sellers displaying their products or services and exchanging product and currency. The buyer and seller may register by adding their personal and financial data to the database of this market platform.

The method may have the steps of: offering a product for sale by a seller at a predetermined price. The seller decides to sell a product through the online marketplace. He commits to make the product available for the duration of his online offering. The next steps may be a buyer committing to purchase the product in an amount equal to the predetermined price and determining if the buyer's account has monies available in an amount greater than or equal to the predetermined price to provide a sufficient currency status or insufficient currency status. If the buyers account has a sufficient currency status, holding monies from the buyer's account in an amount equal to the predetermined price are transferred into a holding account to provide holding account monies. Fees may also be taken out of the holding account for the service described and claimed herein. The present invention may also provide the step of debiting the buyers account directly. Another alternative may be the step of: providing a wire transfer form to the buyer; accepting wire transfer information from the buyer; and transferring monies from the buyer to the holding account. Yet another alternative may be the step of: accepting credit and debit cards, accepting any digital form of a financial instrument from the buyer to permit transfer from the buyers account to the holding account. If the buyers account has insufficient currency status, the transaction is concluded.

Assuming sufficient currency status, the method comprises the steps of messaging the seller the shipping address of the buyer; requiring the seller to verify the date of receipt of the monies from the buyer's account in an amount equal to the predetermined price; requesting the seller to send off, hand over or exchange the product; requesting the seller to verify the shipping status of the product for sale or the exchange product within a shipping confirmation response time frame (the shipping confirmation response time frame may be preset) wherein the shipping status may be shipped, not shipped, negligently shipped or no response.

There are many different outcomes with respect to the shipping status, the following is intended to describe typical outcomes. If the shipping status is shipped and the receipt status is received/accepted the holding monies are transferred to the seller from the holding account. If the shipping status is either not shipped or no response and the receipt status is no response the trade is concluded and the holding monies are transferred to the buyer from the holding account. If the shipping status is not shipped and the receipt status is not received the trade is concluded and the holding monies are transferred to the buyer from the holding account. If the shipping status is shipped and the receipt status is received/not accepted/final return, the trade is not concluded and the buyer is asked to provide reasons for non acceptance and return the product for a final return within a return period. The return period may be preset. If the shipping status is shipped and the receipt status is received/not accepted/exchange, the trade is not concluded and the buyer is asked to provide exchange preferences and return the product for an exchange within a return period. The return period may be preset. In this situation, the method may further comprise the step of: offering an exchange product from the seller to the buyer. If the shipping status is shipped and the receipt status is not received, the trade is not concluded and the seller is asked to reconfirm shipment details within a shipping response time frame. If the shipping status is no response and the receipt status is not received, the trade is not concluded and the seller is asked to reconfirm shipment details within a shipping response time frame. Again, the shipping response time frame may be preset (e.g. two days). If the shipping status is shipped and the receipt status is no response, the trade is not concluded, the buyer and the seller are asked to make direct contact and confirm online an agreement status. If the shipping status is either not shipped or no response and the receipt status is either received/accepted, received/not accepted/exchange or received/not accepted/final return, the trade is not concluded and the buyer and the seller are asked to make direct contact and confirm online an agreement status. The method may further comprise the step of requiring said agreement status within a preset agreement status time frame. An agreement status may be, for example, to transfer the holding monies to the seller, transfer the holding monies to the buyer, continue with the final return procedure, continue with the exchange procedure.

The next step may be requiring the seller to provide shipping information regarding the shipping status. For example, this may include how the product was shipped (e.g. DHL, express mail, first class mail), date of shipment, tracking number, if signature was required for receipt, delivery receipt and to which address the product was shipped.

The next step may be requesting the buyer to verify the receipt status of the product for sale within a receipt confirmation response time frame, wherein the receipt status may be selected from the group consisting of received/accepted, received/not accepted/final return, received/not accepted/exchange, not received and no response.

In the event the buyer wants to return the product, the next step may be requesting the seller to verify the return receipt status of the returned product within a receipt confirmation response time frame, wherein the return receipt status is selected from the group consisting of received/accepted, received/accepted/exchange available, received/accepted/exchange not available, received/not accepted, not received and no response.

Additional inputs may be required regarding the return of a product. This may include the steps of: requiring the seller to provide receipt information regarding the return receipt status of a returned product; requiring the buyer to verify the return shipping status of the returned product within a shipping confirmation response time frame, wherein the return shipping status may be shipped, not shipped, negligently shipped or no response.

The method may further comprise the step of: determining a seller return receipt status, wherein the seller return receipt status is selected from the group consisting of received/accepted, received/no exchange product available, received/exchange product available, not received and no response. If the seller return receipt status is received/accepted, the holding monies are transferred back to the buyer from the holding account. If the seller return receipt status is received/accepted/no exchange product available, the trade is concluded and the holding monies are transferred back to the buyer from the holding account. If the seller return receipt status is received/exchange product available, the seller is asked to send the exchange product to the buyer and confirm shipment within a shipping response time frame. If the seller return receipt status is received/not accepted or not received or no response, the trade is not concluded and the buyer is asked to confirm return shipment to provide a return shipping status within a shipping confirmation response time frame.

The method may further comprise the step of: requiring the buyer to provide receipt information regarding the receipt status; and requiring the buyer to provide shipping information regarding the return shipping status of a returned product. If the return shipping status by the buyer is correctly shipped or no response, the trade is not concluded and the buyer and the seller are asked to make direct contact and confirm online an agreement status. If the return shipping status by the buyer is either not shipped or negligently shipped, the trade is concluded and the holding monies are transferred to the seller from the holding account. The method may further comprise the step of requiring an agreement status within a preset agreement status time frame.

The method may further comprise the step of: assigning a conduct value to the seller based upon the shipping status and the seller's confirmation of the shipping status and of the return receipt status and the seller's confirmation of the return receipt status; assigning a conduct value to the buyer based upon the receipt status and the buyer's confirmation of the receipt status, the return shipping status and the buyer's confirmation of the return shipping status. The conduct value may be positive, negligent, negative or neutral. The evaluation of the conduct of seller and buyer is based on their answers—"yes", a reasoned "no" answer or no answer at all—and the relationship of these answers to one another. The conduct value is measured by their answers or the absence thereof. The relationship of these answers will result in the self evaluation that is publicly available online. A positive conduct value may be given when performing the recommended and necessary action leading to a conclusion of the trade that is agreeable to both parties and confirming it. A negative conduct value may be given when not performing the recommended and necessary action leading to a conclusion of the trade that is agreeable to both parties and not confirming it. A negative conduct value may be given when not performing the recommended and necessary action leading to a conclusion of the trade that is agreeable to both parties and confirming it. A negligent conduct value may be given when performing the recommended and necessary action leading to a conclusion of the trade that is agreeable to both parties and not confirming it. A neutral conduct value may be given when the truth about an action performed or not performed cannot be determined in the statement that is made by confirming or not confirming this recommended and necessary action which in this case would lead to a conclusion of the trade that is not agreeable to both parties.

The buyer's account may be any number of financial instruments including a bank account, credit card, debit account, digital checks, web cents, paypal, t-pay, firstgate, any digital financial instrument and any financial tool that can transfer monies from the buyer to the holding account.

Each of the times frames may be any preset number of days, minutes, etc. For example, the shipping confirmation response time frame may be preset at two days. However, this is not to be taken in a limiting sense as the time frame may be any length of time. The received confirmation response time frame and receipt confirmation response time frame may also be preset.

Each action performed by the seller and the buyer may be initiated and confirmed by a messaging system and registered in a database. The method may further comprise the step of: sending a reminder message by the messaging system if an action was missed or not confirmed; and registering the reminder message in a database.

The step of assigning a conduct value to the seller may be further comprised of: assigning a conduct value to the seller based upon his participation in applying the right action for a positive outcome of the trade and in confirming the shipping status of the original product or an exchange product and the return receipt status in case of a returned product.

The step of assigning a conduct value to the buyer may be further comprised of: assigning a conduct value to the buyer based upon his participation in applying the right action for a positive outcome of the trade and in confirming the receipt status of the original product or an exchange product and the return shipping status in case of a returned product.

The method may further comprise the step of requiring an agreement status within an agreement status time frame. For example, the seller may agree to credit the buyer a certain amount back and send an alternate product. When the agreement status time frame has expired with an agreement between the buyer and the seller, the trade is concluded and the agreement is binding. When the agreement status time frame has expired without an agreement between the buyer and the seller, the trade is concluded, the holding monies are transferred to an intermediate account until the buyer and the seller reach an agreement.

In the event that a product is missing or late, the present invention envisions that the seller may be requested to provide a reconfirmed shipping status. The reconfirmed shipping status may be selected from the group consisting of: shipped, not shipped, negligently shipped or no response. When the shipping status is no response and the receipt status is not received and the subsequent reconfirmed shipping status is not shipped, negligently shipped or no response, the trade is concluded and the holding monies are transferred back to the buyer from the holding account. When the shipping status is shipped and the receipt status is not received and the subsequent reconfirmed shipping status is not shipped or negligently shipped, the trade is concluded and the holding monies are transferred back to the buyer from the holding accounts.

When shipping status is shipped and the receipt status is not received and the subsequent reconfirmed shipping status is shipped, or no response, the seller is asked to provide in-depth details of the shipment within a shipping confirmation response time frame and the buyer is asked to confirm receipt within a receipt confirmation response time frame. When the reconfirmed shipping status of in-depth details of the shipment is shipped, the receipt confirmation is not received or no response, the trade is not concluded and the buyer and the seller are asked to make direct contact and confirm online an agreement status. If the reconfirmed shipping status of in-depth details of the shipment is shipped, the receipt confirmation is received/accepted, the trade is concluded and the holding monies are transferred to the seller from the holding account.

If the reconfirmed shipping status of in-depth details of the shipment is shipped, the receipt confirmation is received/not accepted/final return, the trade is not concluded and the buyer is asked to provide reasons for non acceptance and return the product for a final return within a return period. If the reconfirmed shipping status of in-depth details of the shipment is shipped, the receipt confirmation is received/not accepted/exchange, the trade is not concluded and the buyer is asked to provide exchange preferences and return the product for an exchange within a return period. If the reconfirmed shipping status of in-depth details of the shipment is either not shipped, negligently shipped or no response and the receipt confirmation is received/accepted, received/not accepted/final return, received/not accepted/exchange, not received or no response, the trade is not concluded and the buyer and the seller are asked to make direct contact and confirm online an agreement status.

The modifying actions, those other than the basic re-occurring actions, are a security risk for the other trading partner. The present invention minimizes this risk by: requiring confirmation of every separate action of a transaction between sellers and buyers; initiating immediate and automatic counteraction if seller's or buyer's action/confirmation runs contrary to a smooth uncomplicated transaction process; taking confirmation or lack of confirmation of every step of a transaction to automatically and objectively produce an assessment of the trading partner's conduct in business as every action and its confirmation represents the way a trading partner is conducting himself in business; charging the price of the product to the buyer and transfers it to the seller only after both parties are satisfied with the outcome of the transaction; automatically saving the confirmation actions and the rated conduct in business in a database and making the evaluation available online.

This way the seller and the buyer will always be informed about the status of the transaction and can be assured that the transaction will be secure. They receive the assessment of their conduct solely through their own actions, not through a third party. This evaluation of conduct is entered into a database and can be accessed by any future trading partner.

For effective control of the steps of the transaction it is recommended to deposit all currency into a neutral account, to allow for adequate time to perform a certain action and to confirm the action, to use a mode of shipping that requires a signature upon receipt, to allow for a second chance to perform a certain action and to confirm that action if the first time limit to do so has passed, to keep the trading partners informed about every step via messaging, email or another mode of communication.—These are variables that can be set according to the customs of a certain country, according to the estimated length of time to ship an item etc.

It is strongly recommended to ship only so the recipient has to validate the receipt of the product through his signature. It is important to attain proof of delivery if a worse case scenario arises, such as the buyer insisting he did not receive the product—although he did—and trying to get his currency refunded. Every action/confirmation that the buyer and seller have to perform may be preceded by an informative email. A chosen financial account of the final buyer is debited and the currency (holding account monies) is held in a neutral account till the complete transactions are concluded to everyone's satisfaction. A reasonable time should be allowed to react to and perform each required action/confirmation, such as 2 days—counted from the send-out of the notification—for the seller to ship his product and confirm, 9 days for the buyer to confirm the receipt of the product—counted from the email informing him that his currency was received and that the seller will send the product, etc. As a trading partner may have forgotten to confirm an action he may have already performed (e.g. sending the product but forgetting to confirm online that he did) we give him a second chance to do so within a certain time frame. Confirmations may be done using an online form.

By way of an example, a seller decides to sell a product through the online marketplace. He commits to make the product available for the duration of his online offering. When the buyer buys the product through the final mouse click the purchase price is paid by debiting the buyer's bank account or credit card (or via another financial instrument) and will be held in trust in an account of the online service. The method may comprise the step of debiting the buyers account directly. Now the seller will receive an email with the mailing address of the buyer and other information on this sale. He will be asked to verify the date of receipt for the currency in the holding account and to subsequently ship the product within a couple days and to confirm the shipping or the personal delivery online. He can answer "shipped" or "not shipped" or he may choose not to answer at all. If he answers "shipped" he will be presented with a form to give some additional information about the shipment. If he chooses "not shipped" he will be asked to justify his behavior. He can select the appropriate reason from a menu. No confirmation will trigger further inquiries. The purchase price which is held in trust will be blocked. It will not be transferred—to the seller or back to the buyer—till this problem is solved. A system of online forms and emails has been created to accomplish this.

The buyer will also receive an email regarding the sale and is asked to confirm the receipt and his acceptance of the product. His answer can be "received/accepted", "received/not accepted/final return", "received/not accepted/exchange", "not received" or he may elect not to answer at all. If he answers "received/accepted" he will be presented with a form to give some additional information about receiving and accepting the product. If he answers "received/not accepted/final return" he will be presented with a form to select his reason of non-acceptance from a menu and asked to return the product. If he answers "received/not accepted/exchange" he will be presented with a form to select his reason of non-acceptance from a menu and asked to return the product. The return of product will also be monitored. His "received/accepted" answer will trigger the transfer of the purchase price to the seller if the seller confirmed correct shipment. The "not received" answer will trigger inquiries with the seller. Also no confirmation will trigger further inquiries. Until the situation is resolved the purchase price which is held in trust will not be transferred to either party.

If the buyer or the seller do not answer within a certain time frame they will be reminded by email to do so. A method of tracking and requiring information through a series of online forms and emails has been created to produce clear statements about the shipping, receipt and acceptance of the original product as well as about the return of the product in case of non-acceptance or if the returned product was received, not received, accepted or not accepted. Until it is clear where the product is, if it is in an acceptable condition and who deserves the currency (Is it to be transferred to the seller or back to the buyer ?) or if another feasible solution has been reached, the transaction is not over and the currency is not transferred. Therefore the possibility of fraud is vastly reduced.—Both parties are constantly informed about the status of the transactions by way of emails or they may view it in their online account.

The evaluation of the conduct of seller and buyer is based on their answers, and the relationship of these answers to one another. Their conduct is measured by their answers or the absence thereof. The relationship of these answers will result in the self evaluation that is publicly available online.

In the ideal transaction without complications, the buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. After the seller sends off the product he confirms this action online. When the buyer receives and accepts the product he confirms "received/accepted" online. This last confirmation triggers the currency transfer from the shop account to the seller's account. As each of the trading partners have conducted themselves flawlessly both of them receive a conduct value rating of "positive" for a successful transaction. The transaction is concluded.

Not all transactions, though, will go smoothly. There may be many different complications. A first complication may be that the buyer does not hand over the currency. We will run through many common scenarios each starting with the step of: the buyer committing to purchase the product. Next the currency will be automatically transferred from the buyer's bank, credit card service or some other financial service (Information given in the registration) to the shop account. No currency can be transferred because of insufficient funds or other reasons. Both trading partners are notified that no currency could be transferred and that therefore the transaction is concluded. As the seller has done nothing wrong he receives a conduct value of "positive" for an unsuccessful transaction while the buyer receives a negative conduct value due to his insufficient funds for this unsuccessful transaction.

A second complication may be that the seller does not send the product. The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. He confirms that no product has been sent. The buyer confirms no receipt because of (1) non-delivery (2) because of change of address, (3) because not picking up from shipper. This last confirmation triggers the currency transfer back from the shop account to the buyer's account. In the first situation, as the buyer has done nothing wrong he receives a positive conduct value and the seller receives a negative conduct value for non-shipment. In the second situation, and third situation, the buyer receives a negligent conduct value due to his careless handling of the potential receipt of the product. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. He confirms that no product has been sent. But the buyer confirms receipt and acceptance of the product OR the buyer confirms receipt but no acceptance of the product. This confirmation shows a discrepancy between the seller's and the buyer's answers. Therefore the seller and buyer are asked to take up direct contact and find an agreement. Depending on their agreement—confirmed online—either the seller or the buyer receives the currency or they have the option—if the buyer actually received the product—to do a final return or to exchange the product. Taking that option, this mutual decision concerning the acceptance and return of the product triggers a final return or exchange transaction process as described herein. As the buyer has conducted himself correctly he receives a conduct value of "positive" for this transaction (It cannot be determined if he just pressed the wrong button and did not receive the product, a carelessness which warrants a "negligent" OR if he actually pressed the right button and received it,—a correct confirmation which warrants a "positive". The possible "negligent" conduct value is softened to "positive" when an agreement is reached) while the seller receives a "negligent" conduct value for this transaction due to his negligent confirmation procedure (The seller definitely did not conduct himself properly which normally warrants a negative. Here it is softened by coming to an agreement with the buyer). The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. He confirms that no product has been sent. The buyer does not confirm receipt or acceptance of the product. The absence of a response by the buyer (in combination with the seller's negative confirmation) triggers the currency transfer from the shop account back to the buyer's account. As the buyer has conducted himself negligently he receives a conduct value of "negligent" for an unsuccessful transaction while the seller receives a negative conduct value due to his non-shipment of the product for this unsuccessful transaction. The transaction is concluded.

A third complication may be that the seller does not confirm the sending of the product. The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. He does not confirm the shipment. The buyer confirms no receipt because of (1) non-delivery (2) because of change of address, (3) because not picking up from shipper). Due to the fact that the buyer may have not waited long enough to receive the product as the shipping service may have delayed shipment the seller is urged to reconfirm the status of the shipment and to give the shipment details.

Subsequently, no reconfirmation on part of the seller is now interpreted as not shipped as he repeatedly did not confirm. This triggers the currency transfer back from the shop account to the buyer's account. As the buyer has done nothing wrong he receives a conduct value of "positive" for non-receipt due to a non-delivery, in the situation of a non-receipt confirmation due to a change of address or not picking up from shipper, the buyer will get a "negligent" conduct value for an unsuccessful transaction. The seller receives a negative conduct value due to his non-shipment of the product for this unsuccessful transaction. The transaction is concluded.

In the event the seller reconfirms that nothing was shipped or was shipped incorrectly, his reconfirmation triggers the currency transfer back from the shop account to the buyer's account. As the buyer has done nothing wrong he receives a positive conduct value for an unsuccessful transaction (an original non-receipt confirmation due to change of address or not picking up from shipper triggers a negligent conduct value for the buyer) while the seller receives a negative conduct value due to his non-shipment of the product for this unsuccessful transaction. The transaction is concluded.

Another scenario may arise in the event the seller reconfirms that everything was shipped correctly. In a first instance, the buyer confirms the belated receipt and acceptance of the product. The positive response by the buyer triggers the currency transfer from the shop account to the seller's account. As the buyer has conducted himself correctly he receives a positive conduct value for a successful transaction. (An original non-receipt confirmation due to change of address or not picking up from shipping triggers a negligent conduct value for the buyer) while the seller receives a "negligent" conduct value due to his original negligent shipment confirmation for this successful transaction. The transaction is concluded.

As above, the seller reconfirms that everything was shipped correctly. Now the buyer confirms the belated receipt but no acceptance of the product. The negative response by the buyer concerning the acceptance of the product triggers a return or exchange procedure as described herein. Even if this transaction concludes successfully the seller receives a "negligent" conduct value due to his original negligent shipment confirmation.

Although the seller reconfirms, as above, that everything was shipped correctly the buyer again confirms non-receipt of the product or now gives no confirmation at all. In any case seller and buyer are asked to take up direct contact and find an agreement. Depending on their agreement—confirmed online—either the seller or the buyer receives the currency or they have the option—if the buyer actually received the product—to do a final return or to exchange the product. Taking that option this last mutual decision concerning the acceptance and return of the product triggers a final return or exchange procedure as described herein. As the buyer has conducted himself correctly he receives a "positive" conduct value (A non-receipt confirmation in this instance or in the original confirmation due to change of address or not picking up from shipper triggers a negligent conduct value for the buyer) for this transaction while the seller receives a "negligent" conduct value for this transaction due to his original negligent confirmation procedure. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. He does not confirm the shipment. But the buyer confirms receipt and acceptance of the product OR the buyer confirms receipt but no acceptance of the product. Although the buyer seems to have received the product we do not really know without the confirmation of the seller. Therefore the seller and buyer are asked to take up direct contact and find an agreement. Depending on their agreement—confirmed online—either the seller or the buyer receives the currency or they have the option—if the buyer actually received the product—to do a final return or to exchange the product. Taking that option, this last mutual decision concerning the acceptance and return of the product triggers a final return or exchange procedure as described herein. As the buyer has conducted himself properly he receives a conduct value of "positive" for this transaction (It cannot be determined if he actually received the product or did not. The last case would show negligence in pressing the wrong button which warrants a "negligent". The possible "negligent" conduct value is softened to "positive" when an agreement is reached). While the seller receives a "negligent" conduct value for this transaction due to his negligent confirmation procedure. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. He does not confirm the shipment. The buyer does not confirm receipt or acceptance of the product, he gives no response at all. The absence of a response by the buyer in combination with the seller's absence of confirmation is interpreted as "not shipped/not received" and triggers the currency transfer from the shop account back to the buyer's account. As the buyer has conducted himself negligently without doing a wrong action he receives a conduct value of "negligent" for an unsuccessful transaction while the seller receives a negative conduct value due to his non-shipment of the product for this unsuccessful transaction. The transaction is concluded.

A fourth complication may be that the buyer does not receive the product. The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller confirms the shipment. But the buyer confirms no receipt because of (1) non-delivery (or (2) because of change of address; (3) because not picking up from shipper). Due to the fact that the buyer may have not waited long enough to receive the product as the shipping service may have delayed shipment the seller is urged to reconfirm the status of the shipment and to give the shipment details. The seller reconfirms that nothing was shipped. Now the seller corrects his first positive confirmation. This triggers the currency transfer back from the shop account to the buyer's account. As the buyer has done nothing wrong he receives a "positive" conduct value for his original non-receipt confirmation due to non-delivery. If non-receipt confirmation due to carelessness because of a change of address, the buyer receives a "negligent" conduct value. If non-receipt confirmation because not picking up from shipper, the buyer receives a "negligent" conduct value. The seller receives a negative conduct value due to his non-shipment of the product for this unsuccessful transaction. The transaction is concluded.

The seller reconfirms that everything was shipped correctly. The buyer confirms the belated receipt and acceptance of the product. The positive response by the buyer triggers the currency transfer from the shop account to the seller's account. The buyer receives a "positive" conduct value. If his original non-receipt confirmation showed to carelessness because of a change of address the buyer receives a "negligent" conduct rating. If his original non-receipt confirmation showed carelessness because the buyer did not pick up from shipper the buyer receives a "negligent" conduct rating for this successful transaction. The seller receives a conduct value of "positive" for a successful transaction. The transaction is concluded.

As above, the seller reconfirms that everything was shipped correctly. The buyer confirms the belated receipt but no acceptance of the product. The negative response by the buyer concerning the acceptance of the product triggers a return or exchange procedure as described herein.

As above the seller reconfirms that everything was shipped correctly. Now the buyer again confirms non-receipt of the product or now gives no confirmation at all. In any case seller and buyer are asked to take up direct contact and find an agreement. Depending on their agreement—confirmed online—either the seller or the buyer receives the currency or they have the option—if the buyer actually received the product—to do a final return or to exchange the product. Taking that option this last mutual decision concerning the acceptance and return of the product triggers a final return or exchange procedure as described herein. The buyer receives a "positive" conduct value for a confirmation due to non-delivery (he is not punished for giving no confirmation at this time as he already responded in the first place). Alternatively, if this confirmation or an original non-receipt confirmation showed carelessness because of a change of address the buyer receives a "negligent" conduct value. If the buyer (now or originally) confirmed non-receipt due to not picking up from shipper, the buyer receives a "negligent" conduct value for this transaction. The seller receives a conduct value of "positive" for this transaction. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The seller does not reconfirm anything now, after initially confirming shipping the product. The buyer may or may not respond. In any case seller and buyer are asked to take up direct contact and find an agreement. Depending on their agreement—confirmed online—either the seller or the buyer receives the currency or they have the option—if the buyer actually received the product—to do a final return or to exchange the product. Taking that option this last mutual decision concerning the acceptance and return of the product triggers a final return or exchange procedure as described herein. The buyer receives a "positive" conduct value for the present or the original confirmation due to non-delivery (he is not punished for giving no confirmation at this time as he already responded in the first place). Alternatively, if his present or original confirmation showed carelessness because of a change of address or because not picking up from the shipper, the buyer receives a "negligent" conduct rating for this transaction; the seller receives a conduct value of "negligent" for skipping the reconfirmation this time. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller does not confirm the shipment. The buyer confirms no receipt because of (1) non-delivery; (2) because of change of address; or (3) because not picking up from shipper. Due to the fact that the buyer may have not waited long enough to receive the product as the shipping service may have delayed shipment the seller is urged to reconfirm the status of the shipment and to give the shipment details. No reconfirmation on part of the seller is now interpreted as not shipped as he repeatedly did not confirm. This triggers the currency transfer back from the shop account to the buyer's account. The buyer receives a "positive" conduct value for a confirmation of non-receipt due to non-delivery by the seller, or a "negligent" conduct value due a confirmation to carelessness because of change of address or for not picking up from shipper. The seller receives a negative conduct value due to his non-shipment of the product for this unsuccessful transaction. The transaction is concluded.

Alternatively, the seller reconfirms that nothing was shipped. This last confirmation triggers the currency transfer back from the shop account to the buyer's account. The buyer receives a conduct value of "positive" for a confirmation of non-receipt due to non-delivery or "negligent" due to carelessness because of a confirmation of non-receipt due to a of change of address or not picking up from shipper. The seller receives a negative conduct value due to his non-shipment of the product for this unsuccessful transaction. The transaction is concluded.

Having not confirmed anything before, the seller now reconfirms that everything was shipped correctly. The buyer confirms the belated receipt and acceptance of the product. The positive response by the buyer triggers the currency transfer from the shop account to the seller's account. The buyer receives a conduct value of "positive" for a confirmation of non-receipt due to non-delivery or "negligent" due to carelessness because of a confirmation of non-receipt due to a change of address or not picking up from shipper. The seller receives a conduct value of "negligent" due to his original non-confirmation of shipping the product for this successful transaction. The transaction is concluded.

Having missed his first chance to confirm, the seller reconfirms that everything was shipped correctly. The buyer confirms the belated receipt but no acceptance of the product. The negative response by the buyer concerning the acceptance of the product triggers a return or exchange procedure as described herein.

After giving no confirmation before, the seller now reconfirms that everything was shipped correctly. Now the buyer confirms non-receipt of the product or now gives no confirmation at all. In any case seller and buyer are asked to take up direct contact and find an agreement. Depending on their agreement—confirmed online—either the seller or the buyer receives the currency or they have the option—if the buyer actually received the product—to do a final return or to exchange the product. Taking that option this mutual decision concerning the acceptance and return of the product triggers a final return or exchange procedure as described herein. The buyer receives a conduct value of "positive" for a present or original confirmation of non-receipt due to non-delivery (he is not punished for giving no confirmation at this time as he already responded in the first place) or "negligent" due to carelessness because of a present or original confirmation of non-receipt due to a of change of address or not picking up from shipper. The seller receives a "negligent" conduct value for this transaction due to his original negligent confirmation procedure. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller confirms that no product has been sent. The buyer confirms no receipt because of (1) non-delivery; (2) because of change of address; or (3) because not picking up from shipper). This last confirmation triggers the currency transfer back from the shop account to the buyer's account. The buyer receives a conduct value of "positive" for a confirmation of non-receipt due to non-delivery or "negligent" due to carelessness because of a confirmation of non-receipt due to a of change of address or not picking up from shipper. The seller receives a negative conduct value due to his non-shipment of the product for this unsuccessful transaction. The transaction is concluded.

A fifth complication may be that the buyer does not confirm the receipt of the product. The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller confirms that the product has been sent. The buyer does not confirm the receipt. The buyer having been notified of the shipment has a second chance to confirm the receipt or the possible non-receipt of the product. If he ignores these chances for confirmation the seller and buyer are asked to take up direct contact and find an agreement. Depending on their agreement—confirmed online—either the seller or the buyer receives the currency or they have the option—if the buyer actually received the product—to do a final return or to exchange the product. Taking that option this mutual decision concerning the acceptance and return of the product triggers a final return or exchange procedure as described herein. The buyer receives a conduct value of "negligent" due to his negligent confirmation procedure for this transaction; while the seller receives a "positive" conduct value for this transaction. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller confirms that the product has not been sent. The buyer does not confirm the receipt. The buyer having been notified of the shipment has a second chance to confirm the receipt or the possible non-receipt of the product. If the time limit to respond to the second chance for confirmation has passed then the buyer's no confirmation (in combination with seller's statement that nothing was shipped) is interpreted as "not received". This triggers the currency transfer back from the shop account to the buyer's account. The seller receives a conduct value of negative for this unsuccessful transaction due to his non-shipment of the product. The buyer receives a "negligent" conduct value due to his negligent confirmation procedure for this unsuccessful transaction. The transaction is concluded.

The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller does not confirm any shipment. The buyer does not confirm the receipt. The buyer having been notified of the shipment has a second chance to confirm the receipt or the possible non-receipt of the product. Also the seller gets notification urging him to confirm a second time. No confirmations are taking place. As no information about shipment or receipt has been transmitted this is interpreted as "no transaction occurred". This triggers the currency transfer back from the shop account to the buyer's account. The buyer receives a conduct value "negligent" for his negligent confirmation procedure for this unsuccessful transaction while the seller receives a negative conduct value due to his non-shipment of the product for this unsuccessful transaction. The transaction is concluded.

A sixth complication may be that the buyer does not accept the product. The buyer commits to purchase the product. Now the currency will be automatically transferred from the buyer's bank, credit card service or some other financial service (Information given in the registration) to the shop account. With the successful transfer of the currency the seller is notified to send out the product while the buyer is asked to look for the delivery of the product. Now the seller is supposed to send off the product. The seller confirms that the product has been sent. The buyer confirms the receipt of the product but does not accept it. He has to return the product to the seller, he can return it for good or exchange it. In order for the currency to be transferred back to the buyer's account the returned product—which is returned for a final return not exchanged—has to be received and accepted by the seller. If the product is to be exchanged, the original product has to be returned to and accepted by the seller and the newly exchanged product has to be received and accepted by the buyer in order for the currency to be transferred to the seller's account.

Final return of the product without exchange: The seller confirms that he received the returned product and accepted it. This last confirmation triggers the currency transfer back from the shop account to the buyer's account. The buyer receives a "positive" conduct value for this transaction for following correct procedure. The seller receives for shipping and confirming a "positive" conduct value. The transaction is concluded.

In another instance, the seller may confirm that he received the returned product but does not accept it OR that he did not receive the returned product because of (1) non-delivery; (2) because of change of address; (3) because not picking up from shipper); OR (4) he gives no confirmation at all. The buyer is urged to confirm the return shipment and the condition of product at the time of the return shipment.

Now the buyer confirms that nothing was returned and/or that the condition of the returned product at the time of return shipment was not the same condition as in the original delivery. This last confirmation triggers the currency transfer from the shop account to the seller's account. As the buyer has acted incorrectly he receives a conduct value of negative for an unsuccessful transaction while the seller receives a "positive" conduct value for confirming the receipt/non-acceptance or confirming the non-receipt because of no delivery. The seller may also receive "negligent" conduct value because of a confirmation of non-receipt showing carelessness due to a change of address, not picking up from shipper or because of no confirmation of the returned product. The transaction is concluded.

Having been urged to confirm the return shipment, the buyer confirms that the product to be returned was shipped and was in the same condition as in the original delivery at the time of return shipment. Seller and buyer are asked to take up direct contact and find an agreement. Depending on their agreement—confirmed online—either the seller or the buyer receives the currency or they have the option—if the buyer actually received the product—to continue with the final return or to exchange the product. Taking that option this mutual decision concerning the acceptance and return of the product triggers a continuation of the final return or exchange procedure as described herein. The buyer receives a "positive" conduct value for this transaction for following correct procedure. The seller receives a "positive" conduct value for confirming the receipt/non-acceptance or confirming the non-receipt because of no delivery. Alternatively, the seller may receive a "negligent" conduct value because of a confirmation of non-receipt showing carelessness due to a change of address, not picking up from shipper or because of no confirmation of the returned product. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. The transaction is concluded.

Urged to confirm the return shipment, the buyer does not confirm that the product to be returned was shipped and was in the same condition as in the original delivery at the time of return shipment. Seller and buyer are asked to take up direct contact and find an agreement. Depending on their agreement—confirmed online—either the seller or the buyer receives the currency or they have the option—if the buyer actually received the product—to continue with the final return or to exchange the product. Taking that option this mutual decision concerning the acceptance and return of the product triggers a continuation of the final return or exchange procedure as described herein. The buyer receives a conduct value of "negligent" for this transaction due to his negligent return shipment confirmation while the seller receives a "positive" conduct value for confirming the receipt/non-acceptance or confirming the non-receipt because of no delivery. The seller may alternatively receive a "negligent" conduct value because of a non-receipt confirmation due to a change of address or not picking up from shipper or because of no confirmation of the returned product. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The following describes the return of the product with exchange. The seller confirms that he received the returned product, accepted it and that an exchange product can be shipped. Now the seller is supposed to send off the new product. Then the seller (1) confirms that the exchanged product has been sent; (2) confirms that nothing was shipped; or (3) does not give any confirmation. The buyer (I.) confirms the receipt of the exchanged product and accepts it; (II.) confirms the receipt of the exchanged product but does not accept it; or (III.) confirms not having received the exchanged product because of non-delivery; change of address; not picking up from shipper), or does not give a confirmation. In order to continue with the intended exchange of currency and product, the various transaction steps and confirmations have to be made by both trading partners as described herein. The trade continues till it is finally concluded by the intended proper exchange of currency and product or by way of a final solution to the arising complication. Only then is the evaluation for the buyer's and seller's conduct given.

The seller confirms that he received the returned product, accepted it and that he has no exchange product. This last confirmation triggers the currency transfer from the shop account back to the buyer's account. As the buyer has acted correctly he receives a conduct value of "positive" for an unsuccessful transaction while the seller receives for his correct conduct a "positive" conduct value for confirming the receipt/acceptance of the returned product and confirming the unavailability of an exchange product. The transaction is concluded.

The seller confirms that he received the returned product but does not accept it OR that he did not receive the returned product because of (1) non-delivery; (2) because of change of address; (3) because not picking up from shipper); OR (4) he gives no confirmation at all. The buyer is urged to confirm the return shipment and the condition of product at the time of the return shipment. The buyer confirms that nothing was returned and/or that the condition of the returned product at the time of return shipment was not the same condition as in the original delivery. This last confirmation triggers the currency transfer from the shop account to the seller's account. As the buyer has acted incorrectly he receives a conduct value of negative for an unsuccessful transaction while the seller receives a "positive" conduct value when confirming the receipt/non-acceptance or confirming the non-receipt because of no delivery. Alternatively a "negligent" conduct value may be given to the seller because of a confirmation of non-receipt showing carelessness due to a change of address, not picking up from shipper or because of no confirmation of the returned product. The transaction is concluded.

Urged to confirm the return shipment, the buyer confirms that the product to be returned was shipped and was in the same condition as in the original delivery at the time of return shipment. Seller and buyer are asked to take up direct contact and find an agreement. Depending on their agreement—confirmed online—either the seller or the buyer receives the currency or they have the option—if the buyer actually received the product—to do a final return or to continue to exchange the product. Taking that option this mutual decision concerning the acceptance and return of the product triggers a final return or a continuation of the exchange procedure as described herein. The buyer receives a "positive" conduct value for this transaction for following correct procedure. The seller receives a "positive" conduct value for confirming the receipt/non-acceptance or confirming the non-receipt because of no delivery. Alternatively, the seller receives a "negligent" conduct value because of a confirmation of non-receipt showing carelessness due to a change of address, not picking up from shipper or because of no confirmation of the returned product. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

Even after being urged to confirm that return shipment the buyer does not confirm that the product to be returned was shipped and was in the same condition as in the original delivery at the time of return shipment. Seller and buyer are asked to take up direct contact and find an agreement. Depending on their agreement—confirmed online—either the seller or the buyer receives the currency or they have the option—if the buyer actually received the product—to do a final return or to continue to exchange the product. Taking that option this mutual decision concerning the acceptance and return of the product triggers a final return or a continuation of the exchange procedure as described herein. The buyer receives a conduct value of "negligent" for this transaction due to his negligent return shipment confirmation while the seller receives a "positive" conduct value when confirming the receipt/non-acceptance or confirming the non-receipt because of no delivery. The seller may alternatively receive a "negligent" conduct value because of a confirmation of non-receipt showing carelessness due for a change of address, for not picking up from shipper or because of no confirmation of the returned product. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

The buyer commits to purchase the product. Now the currency will be automatically transferred from the buyer's bank (Information given in the registration) to the shop account. With the successful transfer of the currency the seller is notified to send out the product while the buyer is asked to look for the delivery of the product. Now the seller is supposed to send off the product. The seller confirms that nothing was shipped OR the seller does not give any confirmation. The buyer confirms the receipt of the product but does not accept it. As the negative confirmation/no-confirmation of the seller and buyer indicate opposite scenarios they are asked to take up direct contact and find an agreement. Depending on their agreement—confirmed online—either the seller or the buyer receives the currency or they have the option—if the buyer actually received the product—to do a final return or to exchange the product. Taking that option this mutual decision concerning the acceptance and return of the product triggers either a final return or exchange procedure as described herein. The buyer receives a "positive" conduct value. It cannot be determined if he just pressed the wrong button and did not receive the product, a carelessness which warrants a "negligent" OR if he actually pressed the right button received it which warrants a "positive". The possible "negligent" conduct value is softened to "positive" when an agreement is reached. The seller receives a "negligent" conduct value. The seller definitely did not conduct himself properly which normally warrants a negative. Here it is softened by coming to an agreement with the buyer. The transaction is concluded.—If the trading partners do not come to an agreement (both receive a "neutral" conduct value as at this point it cannot be proven who is right) or do not confirm any agreement (both receive a negative conduct value) the transaction details are related to a third party mediator who will mediate between the two parties. Alternatively, the parties may mediate themselves. The transaction is concluded.

It should be understood that the foregoing relates to preferred embodiments of the invention and that modifications may be made without departing from the spirit and scope of the invention as set forth in the following claims.

The invention claimed is:

1. A computer implemented method for facilitating a trade between a buyer and a seller of a product, said method comprising the steps of:

offering a product for sale on at least one computer by said seller at a predetermined price;

committing to purchase on at least one computer said product by said buyer in an amount equal to said predetermined price;

determining on at least one computer if said buyers account has monies available in an amount greater than or equal to said predetermined price to provide a sufficient currency status or insufficient currency status, wherein said buyers account has a sufficient currency status, holding monies from said buyer's account in an amount equal to said predetermined price are transferred into a holding account to provide holding account monies;

wherein said buyers account has insufficient currency status, transaction is concluded;

messaging by at least one computer said seller the shipping address of said buyer;

requiring said seller to verify on at least one computer the date of receipt of said monies from said buyer's account in an amount equal to said predetermined price;

requesting said seller to send off, hand over or exchange said product;

requesting said seller to verify the shipping status on at least one computer of said product for sale or said exchange product within a shipping confirmation response time frame, wherein said shipping status may be shipped, not shipped, negligently shipped or no response;

requesting said buyer to receive said product or said exchange product;

requesting said buyer to verify the receipt status on at least one computer of said product for sale or said exchange product within a receipt confirmation response time frame, wherein said receipt status is selected from the group consisting of may be received/accepted, received/not accepted/final return, received/not accepted/exchange, not received and no response;

requesting said seller to receive said returned product;

requesting said seller to verify the return receipt status on at least one computer of said returned product within a receipt confirmation response time frame, wherein said return receipt status is selected from the group consisting of received/accepted, received/accepted/exchange available, received/accepted/exchange not available, received/not accepted, not received and no response;

requesting said buyer to send off or hand over said returned product;

requesting said buyer to verify on at least one computer said return shipping status of said returned product within a shipping confirmation response time frame, wherein said return shipping status may be shipped, not shipped, negligently shipped or no response;

automatically assigning a computer generated conduct value on at least one computer to said seller based upon said shipping status and said sellers confirmation thereof and said return receipt status and said sellers confirmation thereof;

automatically assigning a computer generated conduct value on at least one computer to said buyer based upon said receipt status and said buyers confirmation of said receipt status, said return shipping status and said buyers confirmation of said return shipping status.

2. A computer implemented method as in claim 1, wherein said buyer's account is selected from the group consisting of a bank account, credit card, debit account, digital checks, financial instrument, web cents, paypal, t-pay, firstgate, digital financial instrument and any financial tool that can transfer monies from the buyer to the holding account.

3. A computer implemented method as in claim 1, further comprising the step of:
requiring said seller to provide shipping information on at least one computer regarding said shipping status.

4. A computer implemented method as in claim 1, further comprising the step of:
requiring said seller to provide receipt information on at least one computer regarding said return receipt status of a returned product.

5. A computer implemented method as in claim 1, further comprising the step of:
requiring said buyer to provide receipt information on at least one computer regarding said receipt status.

6. A computer implemented method as in claim 1, further comprising the step of:
requiring said buyer to provide shipping information on at least one computer regarding said return shipping status of a returned product.

7. A computer implemented method as in claim 1, wherein said conduct value is positive, negligent, negative or neutral.

8. A computer implemented method as in claim 1, wherein said shipping confirmation response time frame is preset.

9. A computer implemented method as in claim 1, wherein said receipt confirmation response time frame is preset.

10. A computer implemented method as in claim 1, wherein said buyer and said seller are registered users of a market platform on at least one computer.

11. A computer implemented method as in claim 1, wherein said buyer and said seller register on at least one computer by adding their personal and financial data to the database of this market platform.

12. A computer implemented method as in claim 1, wherein each action performed by said seller and said buyer is initiated and confirmed by a messaging system on at least one computer and is registered in a database.

13. A computer implemented method as in claim 1, further comprising the step of:
sending a reminder message by said messaging system if an action was missed or not confirmed; and registering said reminder message in a database.

14. A computer implemented method as in claim 1, wherein said step of assigning a conduct value to said seller is further comprised of:
assigning a conduct value on at least one computer to said seller based upon his participation in applying the right action for a positive outcome of the trade and in confirming the shipping status of the original product or an exchange product and the return receipt status in case of a returned product.

15. A computer implemented method as in claim 1, wherein said step of assigning a conduct value to said buyer is further comprised of:
assigning a conduct value on at least one computer to said buyer based upon his participation in applying the right action for a positive outcome of the trade and in confirming the receipt status of the original product or an exchange product and the return shipping status in case of a returned product.

16. A computer implemented method as in claim 1, further comprising the steps of:
debiting said buyers account directly.

17. A computer implemented method as in claim 1, further comprising the steps of:
providing a wire transfer form to said buyer;
accepting wire transfer information from said buyer; and
transferring monies from said buyer to said holding account.

18. A computer implemented method as in claim 1, further comprising the steps of:
accepting any digital form of a financial instrument from said buyer to permit transfer from said buyers account to said holding account.

19. A computer implemented method as in claim 1, wherein said shipping status is shipped and said receipt status is received/accepted said holding monies are transferred to said seller from said holding account.

20. A computer implemented method as in claim 1, wherein said shipping status is either not shipped or no response and said receipt status is no response said trade is concluded and said holding monies are transferred to said buyer from said holding account.

21. A computer implemented method as in claim 1, wherein said shipping status is not shipped and said receipt status is not received said trade is concluded and said holding monies are transferred to said buyer from said holding account.

22. A computer implemented method as in claim 1, wherein said shipping status is shipped and said receipt status is received/not accepted/final return, said trade is not concluded and said buyer is asked to provide reasons for non acceptance and return said product for a final return within a return period.

23. A computer implemented method as in claim 1, wherein said shipping status is shipped and said receipt status is received/not accepted/exchange, said trade is not concluded and said buyer is asked to provide exchange preferences and return said product for an exchange within a return period.

24. A computer implemented method as in claim 22, wherein said return period is preset.

25. A computer implemented method as in claim 23, wherein said return period is preset.

26. A computer implemented method as in claim 22, further comprising the step of:
determining a seller return receipt status, wherein said seller return receipt status is selected from the group consisting of received/accepted, received/not accepted, not received and no response.

27. A computer implemented method as in claim 23, further comprising the step of:
determining a seller return receipt status, wherein said seller return receipt status is selected from the group consisting of: received/not accepted, received/accepted/no exchange product available, received/accepted/exchange product available, not received and no response.

28. A computer implemented method as in claim 26, wherein said seller return receipt status is received/accepted and said holding monies are transferred back to said buyer from said holding account.

29. A computer implemented method as in claim 27, wherein said seller return receipt status is received/accepted/no exchange product available, said trade is concluded and said holding monies are transferred back to said buyer from said holding account.

30. A computer implemented method as in claim 27, wherein said seller return receipt status is received/accepted/exchange product available, said seller is asked to send said exchange product to said buyer and confirm shipment within a shipping response time frame and said buyer is required to provide receipt information regarding the receipt status of said exchange product within a receipt confirmation response time frame.

31. A computer implemented method as in claim 1, further comprising the step of:
Offering an exchange product on at least one computer from said seller to said buyer.

32. A computer implemented method as in claim 1, wherein said shipping status is shipped and said receipt status is not received, said trade is not concluded and said seller is asked to reconfirm shipment details within a shipping response time frame.

33. A computer implemented method as in claim 1, wherein said shipping status is no response and said receipt status is not received, said trade is not concluded and said seller is asked to reconfirm shipment details within a shipping response time frame.

34. A computer implemented method as in claim 1, wherein said shipping status is shipped and said receipt status is no response, said trade is not concluded, said buyer and said seller are asked to make direct contact and confirm online an agreement status.

35. A computer implemented method as in claim 1, wherein said shipping status is either not shipped or no response and said receipt status is either received/accepted, received/not accepted/exchange or received/ not accepted/final return, said trade is not concluded and said buyer and said seller are asked to make direct contact and confirm online an agreement status.

36. A computer implemented method as in claim 34, further comprising the step of requiring said agreement status within a preset agreement status time frame.

37. A computer implemented method as in claim 35, further comprising the step of requiring said agreement status within a preset agreement status time frame.

38. A computer implemented method as in claim 36, wherein said agreement status time frame has expired with an agreement between said buyer and said seller, said agreement is binding.

39. A computer implemented method as in claim 37, wherein said agreement status time frame has expired with an agreement between said buyer and said seller and said agreement is binding.

40. A computer implemented method as in claim 36, wherein said agreement status time frame has expired without an agreement between said buyer and said seller, said holding monies are transferred to an intermediate account until said buyer and said seller reach an agreement.

41. A computer implemented method as in claim 37, wherein said agreement status time frame has expired without an agreement between said buyer and said seller, said holding monies are transferred to an intermediate account until said buyer and said seller reach an agreement.

42. A computer implemented method as in claim 32, wherein said seller provides a reconfirmed shipping status, wherein said reconfirmed shipping status is selected from the group consisting of:
shipped, not shipped, negligently shipped or no response.

43. A computer implemented method as in claim 33, wherein said seller provides a reconfirmed shipping status, said reconfirmed shipping status selected from the group consisting of: shipped, not shipped, negligently shipped or no response.

44. A computer implemented method as in claim 43, wherein said reconfirmed shipping status is not shipped, negligently shipped or no response, said trade is concluded and said holding monies are transferred back to said buyer from said holding account.

45. A computer implemented method as in claim 43, wherein said reconfirmed shipping status is shipped, said seller is asked to provide in-depth details of the shipment within a shipping confirmation response time frame and said buyer is asked to confirm receipt within a receipt confirmation response time frame.

46. A computer implemented method as in claim 42, wherein said reconfirmed shipping status is shipped or no response, said seller is asked to provide in-depth details of the shipment within a shipping confirmation response time frame and said buyer is asked to confirm receipt within a receipt confirmation response time frame.

47. A computer implemented method as in claim 42, wherein said reconfirmed shipping status is not shipped or negligently shipped, said trade is concluded and said holding monies are transferred back to said buyer from said holding account.

48. A computer implemented method as in claim 45, wherein said reconfirmed shipping status of in-depth details of the shipment is shipped, said receipt confirmation is not received or no response, said trade is not concluded and said buyer and said seller are asked to make direct contact and confirm online an agreement status.

49. A computer implemented method as in claim 46, wherein said reconfirmed shipping status of in-depth details of the shipment is shipped, said receipt confirmation is not received or no response, said trade is not concluded and said buyer and said seller are asked to make direct contact and confirm online an agreement status.

50. A computer implemented method as in claim 45, wherein said reconfirmed shipping status of in-depth details is shipped, said receipt confirmation is received/accepted, said trade is concluded and said holding monies are transferred to said seller from said holding account.

51. A computer implemented method as in claim 46, wherein said reconfirmed shipping status of in-depth details of the shipment is shipped, said receipt confirmation is received/accepted, said trade is concluded and said holding monies are transferred to said seller from said holding account.

52. computer implemented method as in claim 45, wherein said reconfirmed shipping status of in-depth details of the shipment is shipped, said receipt confirmation is received/not accepted/final return, said trade is not concluded and said buyer is asked to provide reasons for non acceptance and return said product for a final return within a return period.

53. A computer implemented method as in claim 46, wherein said reconfirmed shipping status of in-depth details of the shipment is shipped, said receipt confirmation is received/not accepted/final return, said trade is not concluded and said buyer is asked to provide reasons for non acceptance and return said product for a final return within a return period.

54. A computer implemented method as claim 45, wherein said reconfirmed shipping status of in-depth details of the shipment is shipped, said receipt confirmation is received/not accepted/exchange, said trade is not concluded and said buyer is asked to provide exchange preferences and return said product for an exchange within a return period.

55. A computer implemented method as in claim 46, wherein said reconfirmed shipping status of in-depth details of the shipment is shipped, said receipt confirmation is received/not accepted/exchange, said trade is not concluded and said buyer is asked to provide exchange preferences and return said product for an exchange within a return period.

56. A computer implemented method as in claim 45, wherein said reconfirmed shipping status of in-depth details of the shipment is either not shipped, negligently shipped or no response and said receipt confirmation is received/accepted, received/not accepted/final return, received/not accepted/exchange, not received, no response, said trade is not concluded and said buyer and said seller are asked to make direct contact and confirm online an agreement status.

57. A computer implemented method as in claim 46, wherein said reconfirmed shipping status of in-depth details of the shipment is either not shipped, negligently shipped or no response and said receipt confirmation is received/accepted, received/not accepted/final return, received/not accepted/exchange, not received, no response, said trade is not concluded and said buyer and said seller are asked to make direct contact and confirm online an agreement status.

58. A computer implemented method as in claim 26, wherein said seller return receipt status is received/not accepted or not received or no response, said trade is not concluded and said buyer is asked to confirm return shipment to provide a return shipping status within a shipping confirmation response time frame.

59. A computer implemented method as in claim 27, wherein said seller return receipt status is received/not accepted or not received or no response, said trade is not concluded and said buyer is asked to confirm return shipment to provide a return shipping status within a shipping confirmation response time frame.

60. A computer implemented method as in claim 59, wherein said return shipping status by said buyer is shipped or no response, said trade is not concluded and said buyer and said seller are asked to make direct contact and confirm online an agreement status.

61. A computer implemented method as in claim 59, wherein said return shipping status by said buyer is either not shipped or negligently shipped, said trade is concluded and said holding monies are transferred to said seller from said holding account.

62. A computer implemented method as in claim 58, wherein said return shipping status by said buyer is shipped or no response, said trade is not concluded and said buyer and said seller are asked to make direct contact and confirm online an agreement status.

63. A computer implemented method as in claim 58, wherein said return shipping status by said buyer is either not shipped or negligently shipped, said trade is concluded and said holding monies are transferred to said seller from said holding account.

64. A computer implemented method as in claim 48, further comprising the step of requiring said agreement status within a preset agreement status time frame.

65. A computer implemented method as in claim 49, further comprising the step of requiring said agreement status within a preset agreement status time frame.

66. A computer implemented method as in claim 56, further comprising the step of requiring said agreement status within a preset agreement status time frame.

67. A computer implemented method as in claim 57, further comprising the step of requiring said agreement status within a preset agreement status time frame.

68. A computer implemented method as in claim 60, further comprising the step of requiring said agreement status within a preset agreement status time frame.

69. A computer implemented method as in claim 62, further comprising the step of requiring said agreement status within a preset agreement status time frame.

70. A computer implemented method as in claim 48, wherein said agreement status time frame has expired with an agreement between said buyer and said seller and said agreement is binding.

71. A computer implemented method as in claim 49, wherein said agreement status time frame has expired with an agreement between said buyer and said seller, and said agreement is binding.

72. A computer implemented method as in claim 56, wherein said agreement status time frame has expired with an agreement between said buyer and said seller, and said agreement is binding.

73. A computer implemented method as in claim 57, wherein said agreement status time frame has expired with an agreement between said buyer and said seller, and said agreement is binding.

74. A computer implemented method as in claim 60, wherein said agreement status time frame has expired with an agreement between said buyer and said seller, and said agreement is binding.

75. A computer implemented method as in claim 62, wherein said agreement status time frame has expired with an agreement between said buyer and said seller and said agreement is binding.

76. A computer implemented method as in claim 48, wherein said agreement status time frame has expired without an agreement between said buyer and said seller, said holding monies are transferred to an intermediate account until said buyer and said seller reach an agreement.

77. A computer implemented method as in claim 49, wherein said agreement status time frame has expired without an agreement between said buyer and said seller, said holding monies are transferred to an intermediate account until said buyer and said seller reach an agreement.

78. A computer implemented method as in claim 56, wherein said agreement status time frame has expired without an agreement between said buyer and said seller, said holding monies are transferred to an intermediate account until said buyer and said seller reach an agreement.

79. A computer implemented method as in claim 57, wherein said agreement status time frame has expired without an agreement between said buyer and said seller, said holding monies are transferred to an intermediate account until said buyer and said seller reach an agreement.

80. A computer implemented method as in claim 60, wherein said agreement status time frame has expired without an agreement between said buyer and said seller, said holding monies are transferred to an intermediate account until said buyer and said seller reach an agreement.

81. A computer implemented method as in claim 62, wherein said agreement status time frame has expired without an agreement between said buyer and said seller, said holding monies are transferred to an intermediate account until said buyer and said seller reach an agreement.

82. A computer implemented method as in claim 30, wherein said receipt confirmation response time frame is preset.

\* \* \* \* \*